(12) United States Patent
Chapelain et al.

(10) Patent No.: US 7,547,042 B2
(45) Date of Patent: Jun. 16, 2009

(54) STEERING WHEEL

(75) Inventors: Etienne Chapelain, Migne-Auxances (FR); Thierry Matrat, Vouille (FR); Holger Drees, Munich (DE); Robert Pillgruber, Wolnzach (DE); Americo Maia, Courdimanche (FR); Laurent Hellot, La Feuillie (FR); Satoshi Yagami, Kanagawa (JP); Keiichiro Fu-Jita, Kanagawa (JP); Koichi Minagawa, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 299 days.

(21) Appl. No.: 10/520,030

(22) PCT Filed: Jun. 4, 2003

(86) PCT No.: PCT/SE03/00910

§ 371 (c)(1),
(2), (4) Date: Mar. 9, 2006

(87) PCT Pub. No.: WO2004/005084

PCT Pub. Date: Jan. 15, 2004

(65) Prior Publication Data
US 2006/0226639 A1 Oct. 12, 2006

(30) Foreign Application Priority Data
Jul. 2, 2002 (GB) .................. 0215279.1

(51) Int. Cl.
*B60R 21/203* (2006.01)
*H01H 9/00* (2006.01)
(52) U.S. Cl. .................. 280/731; 280/728.2; 200/61.55

(58) Field of Classification Search .............. 280/728.2, 280/728.3, 731; 200/61.54, 61.55, 61.57
See application file for complete search history.

(56) References Cited

U.S. PATENT DOCUMENTS

| 5,023,412 | A | * | 6/1991 | Ishida ..................... 200/61.54 |
| 5,228,362 | A |   | 7/1993 | Chen et al. |
| 5,338,906 | A | * | 8/1994 | Yokota .................... 200/61.54 |
| 5,350,190 | A | * | 9/1994 | Szigethy .................. 280/728.2 |
| 6,139,051 | A | * | 10/2000 | Fujita ......................... 280/731 |
| 6,161,863 | A |   | 12/2000 | Fujita et al. |

(Continued)

FOREIGN PATENT DOCUMENTS

DE 197 30 837 A1 1/1999

(Continued)

*Primary Examiner*—Paul N. Dickson
*Assistant Examiner*—George D. Spisich
(74) *Attorney, Agent, or Firm*—Brinks Hofer Gilson & Lione

(57) ABSTRACT

A steering wheel is disclosed, the steering wheel comprising a frame as radially outwardly-extending spokes (3,4) and a rim (5). The frame defines a recess to receive an air-bag unit 9. The steering wheel is provided with a number of mounting elements (26) associated with a respective spoke (3,4). Each mounting element (26) is connected to the steering wheel and has a portion (27) overlying part of the steering wheel. The air-bag unit (9) is connected to each mounting element (26) by means of a resiliently-biased connection to permit relative movement of the air-bag unit (9) with respect to the steering wheel, such that the peripheral part of the air-bag unit (9) defines a pre-determined gap between itself and the overlying portion (27) of the mounting element (26).

10 Claims, 3 Drawing Sheets

U.S. PATENT DOCUMENTS

| | | | |
|---|---|---|---|
| 6,213,502 B1 | 4/2001 | Ryan et al. | |
| 6,257,615 B1 * | 7/2001 | Bohn et al. | 280/728.2 |
| 6,312,012 B1 * | 11/2001 | Bohn et al. | 280/731 |
| 6,382,662 B1 | 5/2002 | Igawa | |
| 6,478,330 B2 * | 11/2002 | Fujita | 280/731 |
| 6,600,114 B2 * | 7/2003 | Kikuta et al. | 200/61.55 |
| 6,616,180 B2 * | 9/2003 | Schutz | 280/731 |
| 6,626,458 B2 * | 9/2003 | Fujita et al. | 280/728.3 |
| 6,793,237 B2 * | 9/2004 | Derrick et al. | 280/728.2 |
| 2001/0011815 A1 * | 8/2001 | Ikeda et al. | 280/731 |
| 2001/0035631 A1 | 11/2001 | Hasebe | |
| 2001/0050473 A1 | 12/2001 | Fujita | |
| 2003/0075905 A1 * | 4/2003 | Derrick et al. | 280/728.2 |
| 2003/0155752 A1 * | 8/2003 | Xu et al. | 280/731 |
| 2003/0197355 A1 * | 10/2003 | Bohn et al. | 280/731 |

FOREIGN PATENT DOCUMENTS

| | | |
|---|---|---|
| DE | 201 03 891 U 1 | 5/2002 |
| EP | 0 785 107 A1 | 7/1997 |
| EP | 0 887 239 A3 | 12/1998 |
| EP | 1 153 808 A2 | 11/2001 |
| WO | WO2004/005084 A1 | 1/2004 |

* cited by examiner

STEERING WHEEL

CROSS REFERENCE TO RELATED APPLICATION

This application claims priority to PCT/SE03/000910, filed Jun. 4, 2003 and GB 0215279.1, filed Jul. 2, 2002.

BACKGROUND OF THE INVENTION

The present invention relates to a steering wheel, and more particularly relates to a steering wheel for a motor vehicle.

It has been proposed previously to provide an air-bag which is mounted in the steering wheel of a motor vehicle and the air-bag being provided with an inflator to inflate the air-bag in the event that an accident should arise. Typically the air-bag is located within a "floating" cover or housing provided within the central part of the steering wheel, the "floating" cover or housing being maintained in position by means of springs. Pressure may be applied to the cover or housing to compress the springs and actuate a horn function.

Typically a gap is provided between the outer edge of the floating cover or housing, and at least part of the steering wheel where spokes extend from a central hub to a rim. As the central cover or housing may float, it is necessary to mount the cover or housing on the rest of the steering wheel in such a way that the covering or housing has a certain degree of freedom of movement, and thus it is very difficult to control the dimension of the gap between the outer part of the cover or housing and the adjacent spoke. The problem may be made more complicated by the fact that many steering wheels include an internal frame, to which foam is applied, meaning that different steering wheels may have slightly different thicknesses of foam. While this is not of any great importance with regard to the manner of operation of the steering wheel, a slight degree of difference in thickness of a foam layer on the steering wheel may make a very substantial difference to the width of a gap appearing between the floating cover or housing and the adjacent spoke.

It has been proposed to provide an element which seals the gap, and reference may be made to U.S. Pat. No. 5,228,362 which discloses a steering wheel arrangement of the type generally described above in which a spacer is provided between each spoke and the edge of the floating cover or housing. The spacer is securely connected to the inner framework of the steering wheel. Such an arrangement may assist, but if the cover or housing moves with the permitted degrees of freedom of movement from an initial position, the sizes of the gaps between the floating cover or housing and different spokes may become very different.

The present invention seeks to provide an improved steering wheel unit.

SUMMARY OF THE INVENTION

According to the present invention, there is provided a steering wheel, the steering wheel comprising a frame to be connected to a steering shaft. The frame has radially outwardly extending spokes and a rim and the frame defines a well or recess to receive an air-bag unit. The steering wheel is provided with a plurality of mounting elements, each mounting element being associated with a respective spoke. Each mounting element is connected to the steering wheel and has a portion overlying part of the steering wheel, each mounting element being adjacent a periphery of the air-bag unit. The air-bag unit is connected to each mounting element by means of a respective resiliently biased connection to enable relative movement of the air-bag unit with respect to the steering wheel, the peripheral part of the air-bag unit defining a substantially predetermined gap with the said portion of the mounting element.

Preferably least one of the resiliently biased connections between the air-bag unit and mounting element of the steering wheel includes electric contacts configured to be moved to touch each other on movement of the air-bag unit against the bias to complete a horn or hooter circuit.

Advantageously, each resiliently biased connection comprises a compressible helical spring.

Conveniently, the upper part of each spring is connected to an element which is received within a snap-fit socket provided on a projecting peripheral lip of the air-bag unit.

Preferably, at least some mounting elements are mounted to the steering wheel with a degree of freedom of movement. Movement of each mounting element causes the portion of the mounting element overlying part of the steering wheel to slide relative to the surface of the steering wheel.

Advantageously, there are three mounting elements, one mounting element being mounted to the steering wheel at a predetermined position, and the remaining two mounting elements being mounted to the steering wheel with a degree of freedom of movement.

Conveniently, the steering wheel defines mounting platforms and respective retaining recesses. Each mounting element has a horizontal bias to a respective mounting platform and has depending snap acting elements receivable within the recess. At least some of the recesses have dimensions greater than that of the snap acting elements to provide degrees of freedom of movement.

Preferably each recess is provided within a respective platform.

Advantageously, each recess is provided at a position adjacent a respective the platform.

Conveniently, each platform is located beneath a peripheral lip provided on the air-bag unit, the portion of the mounting element over-lying part of the steering wheel being in the form of a flange, the gap being defined between the peripheral lip and the flange.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
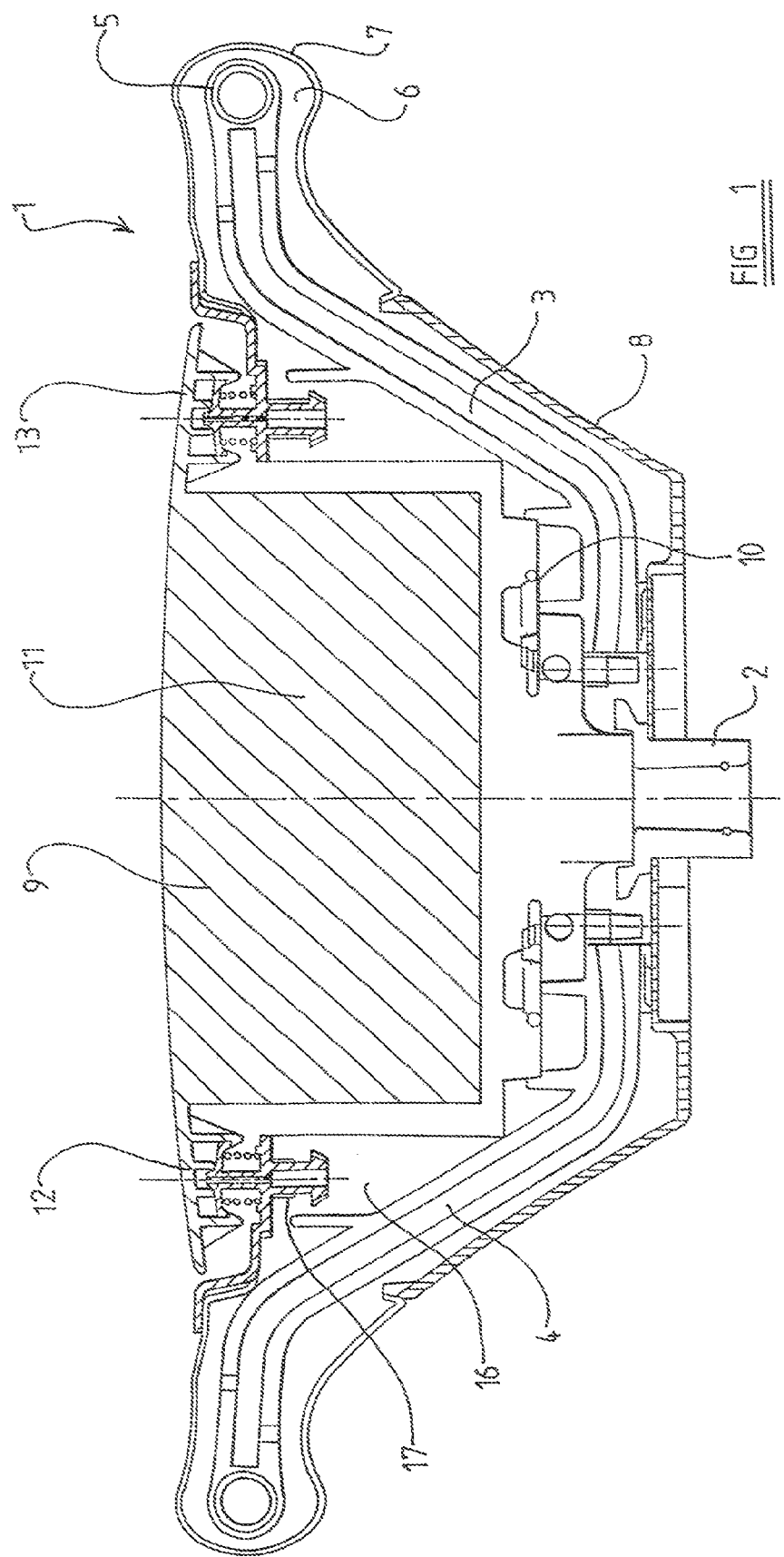
FIG. 1 is a diagrammatic sectional view of a steering wheel in accordance with the invention.

Referring initially to FIG. 1 of the accompanying drawings, a steering wheel 1 is provided. The steering wheel comprises a frame which defines a central hub or boss 2 adapted to be connected to a steering shaft. The hub or boss 2 carries frame members 3, 4 which form radially outwardly extending spokes. The free ends of the outwardly extending spokes are connected to a circular rim 5. The frame is provided with a foam layer 6 provided with an outer seal or leather skin 7 in the exposed regions thereof. A cover 8 is applied to the under-part of the steering wheel 1 for aesthetic reasons.

The boss 2, spokes 3, 4 and rim 5 define a central well or recess which receives an air-bag unit 9. The air-bag unit 9 is releasably connected to the lower part of the steering wheel frame using a spring-clip arrangement 10. The air-bag unit 9 has a central housing 11, which houses the air-bag 9, and an upper cover which extends radially outwardly forming radially extending lips 12, 13 which extend towards the spokes 3, 4. A gap is defined between the free edge of each lip 12, 13 and the adjacent spoke 3, 4, and this is the gap which it is intended should be masked or made to be consistent.

Figure 2:
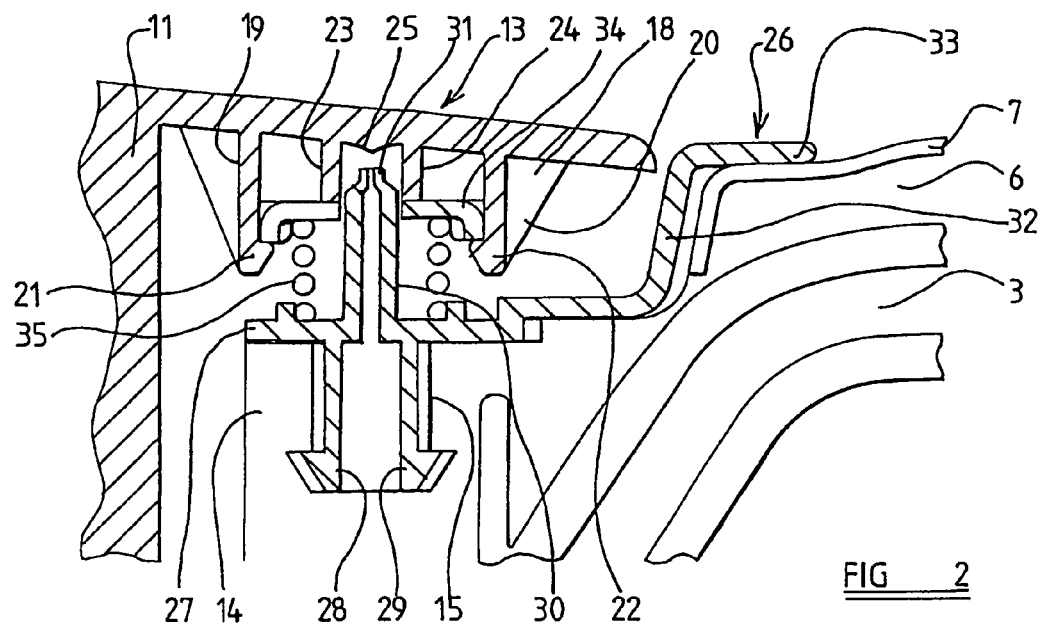
FIG. 2 is an enlarged view of part of the embodiment of FIG. 1.

Turning now to FIG. 2, the right-hand spoke 3 is illustrated in more detail and carries, at a position beneath the radially extending right-hand lip 13, a substantially horizontal platform 14 provided with a recess 15 therein. The recess 15 is configured to receive a snap-fitting. A corresponding platform 16 (see FIG. 1) is provided beneath the left-hand lip 12, with a corresponding recess 17, but the left-hand recess 17 is of slightly lesser dimension (schematically shown in FIG. 1 for illustrative purposes only) compared to the right hand recess.

The recesses 15, 17 as will now be described, receive projections on mounting elements carried by the air-bag unit 9.

With reference to FIG. 2, it will be seen that on the under-surface of the radially projecting lip 13 there is provided a snap socket 18. The snap socket 18 is defined by two spaced-apart depending walls 19, 20 each carrying, at their lower end, an inwardly directed "snap" projection 21, 22. These two walls may move outwardly away from each other with a snap action. Located between the two depending walls 19, 20 are two further depending walls, 23, 24 which do not depend as far below the projecting lip 13 as the first mentioned walls 19, 20. On the under-surface of the cover 13 between the inner depending walls 23, 24 is an electric contact 25.

A mounting element 26 is provided. The mounting element 26 comprises a horizontal portion 27 configured to rest on top of the horizontal platform 14. The horizontal portion 27 is provided with depending snap-acting elements 28, 29 configured to be received within the recess 15. Above the snap-acting elements 28, 29 is an upwardly extending projection 30 dimensioned to be received between the inner depending walls 23, 24 which depend from the projecting lip 13. The upper end of the projection 30 carries an electric contact 31. The horizontal portion 27 of the mounting element 26 extends to an upstanding region 32 which terminates with a generally horizontally extending flange 33 which overlies part of the outer skin 7 of the foam layer 6 as applied to the frame of the steering wheel 1.

A spring abutment plate 34 is provided which is received as a snap-fit between the snap-acting projections 21, 22 provided at the lower ends of the outer depending walls 19, 20 of the snap socket 18 provided on the under-side of the lip 13. The abutment plate 34 is connected to the upper end of a helical compression spring 35 which engages the upper surface of the horizontal portion 27 of the mounting element 26. The upper surface 27 may be provided with upwardly extending locating projections to locate the lower end of the spring 35. The spring 35 thus serves to interconnect the projecting lip 13 with the mounting element 26. It will therefore be seen that the spring 35 therefore effectively represents a resiliently biased connection between the air-bag unit 9 and the mounting element 26.

It can be seen that, in the arrangement shown in FIG. 2, the snap-acting elements 28, 29 provided on the mounting element 26 may move slightly within the recess 15 provided at platform 14, and should the snap-acting elements 28, 29 move in this way, the entire mounting element 26, including the upwardly extending projection 32 and the horizontally extending flange 33, will move in sympathy with the flange 33 sliding over the skin 7 of the foam layer 6.

At this stage it is to be understood that the left-hand projecting lip 12 of the air-bag unit 9 is provided with a similar snap-acting socket, which will not be described in detail, incorporating a mounting element having snap-acting elements engageable within the left-hand recess 17. However, the left-hand recess 17 has a slightly lesser dimension than the right hand recess 15 as illustrated in FIG. 2, and thus the left-hand mounting element is not free to move relative to the platform 14.

It is envisaged that in a typical steering wheel 1 there will be three spokes and three platforms of the type discussed above. One platform, namely the (left-hand as illustrated) platform 16, is provided with a recess 17 with no freedom of movement for the snap-acting elements, and the other two platforms, as exemplified by the (right-hand as illustrated in FIG. 2) platform 14, enabling a degree of freedom of movement for the corresponding snap-acting projections received therein. Thus the air-bag unit 9 may be appropriately positioned with regard to variations in the manufacturing tolerances within the steering wheel 1.

It is to be appreciated that as the snap-acting elements 28, 29 carried by the mounting element 26 move within the recess 15, the rest of the mounting element 26 moves in sympathy with the flange 33 sliding relative to the upper surface of the outer skin 7 of the foam portion 6 of the steering wheel 1.

The outer periphery of the lip 13 is located to be immediately adjacent the flange 33 of the mounting element with a small predetermined gap defined therebetween. The air-bag unit 9 may move up and down against the bias imparted by the spring 35, and the electric contacts 31 and 25 may be brought to touch one another to complete an electric circuit which may, for example, actuate or horn or hooter.

It is to be appreciated that in the above-described embodiment of the invention, the mounting element 26 carries a flange 33 located adjacent the periphery of the upper part of the air-bag unit 9. The flange 33 has a substantially predetermined position relative to the periphery of the air-bag unit 9.

Figure 3:
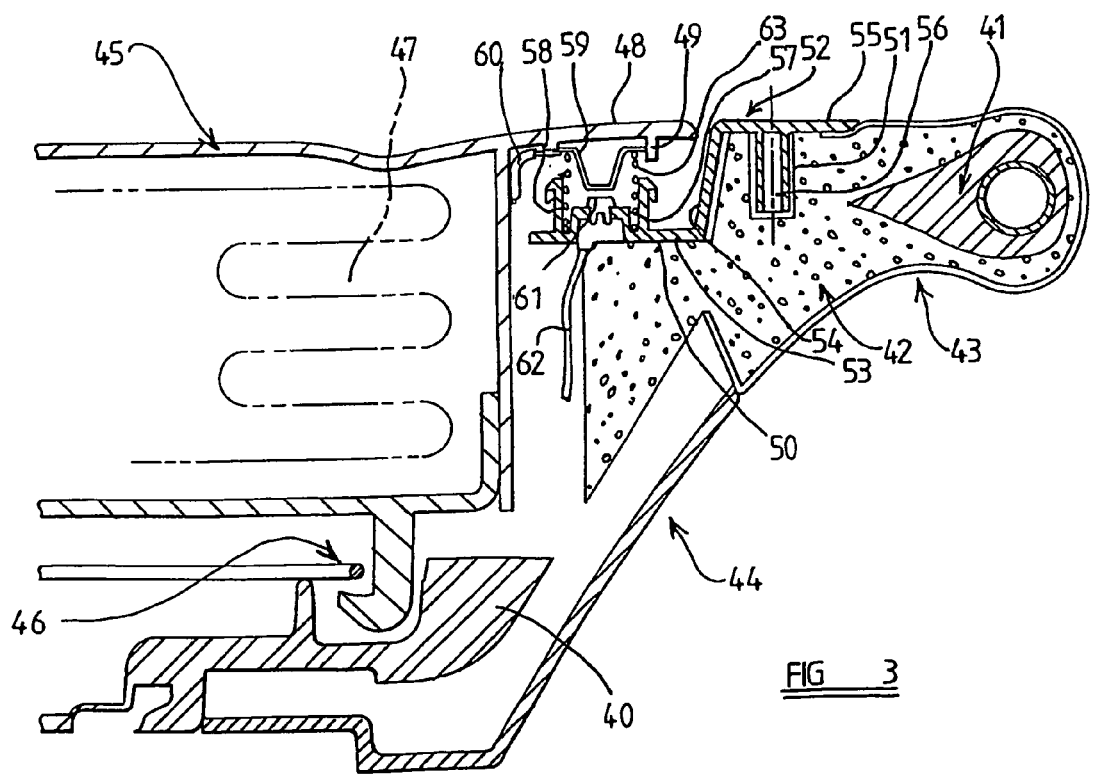
FIG. 3 is a view, corresponding generally to FIG. 1, illustrating part of a modified embodiment of the invention.

FIG. 3 illustrates a second embodiment of the invention. In this embodiment, a steering wheel is provided with an internal frame which defines a lower platform 40 which is associated with the hub or boss. The lower platform 40 is associated with radially outwardly extending spokes which support a peripherally extending ring 41 which forms the rim of the steering wheel. Parts of the frame are covered with a foam layer 42 and the foam, in exposed regions, has an outer skin 43 which may be of plastic or leather. A cover 44 is provided to cover the lower part of the frame for aesthetic reasons.

An air-bag unit 45 is mounted to the frame by means of a snap-action connector 46. The air-bag unit 45 has a housing which contains a folded air-bag 47, and an upper cover with an outwardly extending peripheral lip 48. The under-side of the lip 48 defines a snap socket 49 which receives part of a spring assembly, as will be described.

Part of the foam layer 42 defines a platform 50 located beneath the peripheral lip 48. Adjacent the platform 50 is a connecting recess 51 formed in the foam layer 42.

A mounting element 52 is provided having a horizontal portion 53 thereof supported on the platform 50 beneath the peripheral lip 48. The horizontal portion 53 of the mounting element 52 is connected by an almost vertical intermediate portion 54 to a terminal horizontal flange 55 which lies adjacent the outer periphery of the lip 48 of the air-bag unit 45. The terminal horizontal flange 55 of the mounting element 52 overlies part of the outer skin 43 provided for the foam 42. The flange 55 has, depending from its under-surface, a connection element 56 which is received within the connecting recess 51.

The horizontal portion 53 of the mounting element 52 is provided with two upstanding snap-acting projections 57, 58 which have end parts engaging apertures formed in the snap socket 49 provided under the lip 48 of the air-bag unit 45 to provide a lost motion effect to permit vertical movement of the air-bag unit 45. Provided in the snap socket 49 is an electric contact 59 connected to a cable 60. Provided in the region of the platform 50 is a further electrical contact 61 connected to a further cable 62. A spring 63 is retained between the snap-acting projections 57, 58 on the horizontal part 53 of the mounting element 52, and extending up to the electrical contact 59 provided in the socket 49. It can be seen that the air-bag unit 45 may be depressed against the spring force provided by the spring 63, thus bringing the contacts 59, 61 into connection with each other to complete an electric circuit to sound a horn or hooter or the like.

In this embodiment the mounting element 52 is connected to the main body of the steering wheel by means of the connection element 56. As can be seen from FIG. 3, the connection element 56 may move with a degree of freedom of movement within the connecting recess 51. Thus in this embodiment, the mounting element 52 may move, relative to the frame of the steering wheel with the air-bag unit 45, and a precisely predetermined gap will be defined between the outer periphery of the lip 48 and the adjacent part of the flange 55 of the mounting element 52.

Figure 4:
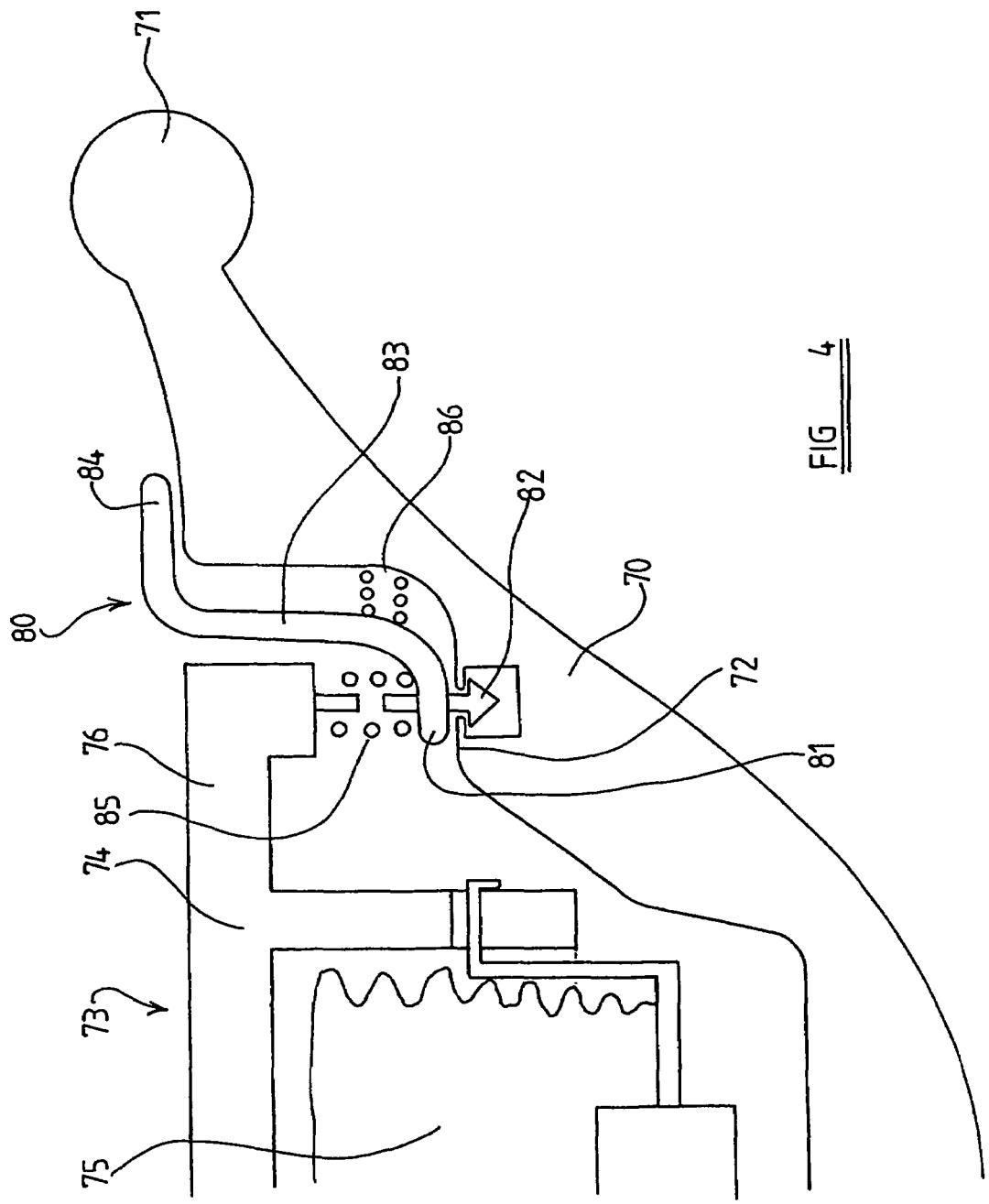
FIG. 4 is a view corresponding to FIG. 3 illustrating yet another modified embodiment of the invention.

Turning finally to FIG. 4, which is a diagrammatic view, it is to be understood that in embodiments of the invention springs may be provided to help "centre" the air-bag unit. Thus, in the embodiment of FIG. 4, the steering wheel has a frame 70 defining an outer rim 71 and a platform 72. An air-bag unit 73 is provided having an upper cover 74 overlying a chamber 75 which contains a folded air-bag. The peripheral part of the cover extends outwardly to form a lip 76 extending over the platform 72.

A mounting element 80 is provided having a portion 81 overlying the platform 72. That portion is provided with a connector element 82 dimensioned to be received within a recess formed in the platform 72. The mounting element includes an intermediate portion 83 which extends from the horizontal portion 81 to a further horizontal flange 84 adjacent the free edge of the lip 76 provided on the air-bag unit and overlying part of the steering wheel 1.

A spring connection 85 (shown schematically in FIG. 4) connects the mounting element 80 and a part of the projecting lip 76. A further spring 86 is provided located between the intermediate portion 83 of the mounting element 80 and part of the frame 70 of the steering wheel to provide a horizontal bias to the mounting element 80, and thus also to the air-bag unit 73.

It is to be appreciated that if three inter-connections are provided between the air-bag unit 73 and the steering wheel of the type shown in FIG. 4, the springs 86 will serve to "self-centre" the air-bag unit 73. As the mounting elements 80 move so the horizontal flanges 84 overlying parts of the steering wheel will slide relative to the steering wheel.

While the above description constitutes the preferred embodiment of the present invention, it will be appreciated that the invention is susceptible to modification, variation and change without departing from the proper scope and fair meaning of the accompanying claims.

The invention claimed is:

1. A steering wheel comprising a frame and an outer skin that at least partially covers the frame, the frame to be connected to a steering shaft and having radially outwardly extending spokes and a rim, the frame defining a recess to receive an air-bag unit, the steering wheel being provided with a plurality of mounting elements, each of the mounting elements being associated with a respective spoke, each of the mounting elements being connected to the steering wheel and having a flange that lies over top of the outer skin of the steering wheel exposing the flange of each of the mounting elements to outside the steering wheel, each of the mounting elements being adjacent a periphery of the air-bag unit; the air-bag unit being connected to each of the mounting elements by means of a respective resiliently biased connection to enable relative movement of the air-bag unit with respect to the steering wheel, the periphery of the air-bag unit defining a substantially controlled gap with the flange of each of the mounting elements.

2. A steering wheel according to claim 1 wherein at least one of the resiliently biased connections between the air-bag unit and one of the mounting elements of the steering wheel includes electric contacts configured to be moved to touch each other on movement of the air-bag unit against the bias of the resiliently biased connection to complete a horn or hooter circuit.

3. A steering wheel according to claim 1 wherein at least one of the resiliently biased connections comprises a compressible helical spring.

4. A steering wheel according to claim 3 wherein the upper part of the spring is connected to an element which is received within a snap-fit socket provided on a projecting peripheral lip of the air-bag unit.

5. A steering wheel according to claim 1 wherein at least one of the mounting elements are mounted to the steering wheel with a degree of freedom of movement, wherein the movement of the mounting element causing the flange of the mounting element that lies over top of the outer skin of the steering wheel to slide relative to the steering wheel.

6. A steering wheel comprising a frame to be connected to a steering shaft, the frame having radially outwardly extending spokes and a rim, the frame defining a recess to receive an air-bag unit, the steering wheel being provided with a plurality of mounting elements, each of the mounting elements being associated with a respective spoke, each of the mounting elements being connected to the steering wheel and having a portion that lies over top of an external part of the steering wheel, each of the mounting elements being adjacent a periphery of the air-bag unit; the air-bag unit being connected to each of the mounting elements by means of a respective resiliently biased connection to enable relative movement of the air-bag unit with respect to the steering wheel, the periphery of the air-bag unit defining a substantially predetermined gap with the portion of each of the mounting elements, wherein at least one of the mounting elements are mounted to the steering wheel with a degree of freedom of movement, the movement of the mounting element causing the portion of the mounting element that lies over top of the external part of the steering wheel to slide relative to the steering wheel, and wherein there are three of the mounting elements, one of the mounting elements being mounted to the steering wheel at a predetermined position without the degree of freedom of movement, and the remaining two of the mounting elements being mounted to the steering wheel with the degree of freedom of movement.

7. A steering wheel comprising a frame to be connected to a steering shaft, the frame having radially outwardly extending spokes and a rim, the frame defining a recess to receive an air-bag unit the steering wheel being provided with a plurality of mounting elements, each of the mounting elements being associated with a respective spoke, each of the mounting elements being connected to the steering wheel and having a portion that lies over top of an external part of the steering wheel, each of the mounting elements being adjacent a periphery of the air-bag unit; the air-bag unit being connected to each of the mounting elements by means of a respective resiliently biased connection to enable relative movement of the air-bag unit with respect to the steering wheel, the periphery of the air-bag unit defining a substantially predetermined gap with the portion of each of the mounting elements, wherein at least one of the mounting elements are mounted to the steering wheel with a degree of freedom of movement the movement of the mounting element causing the portion of the mounting element that lies over top of the external part of the steering wheel to slide relative to the steering wheel, and wherein the steering wheel defines mounting platforms and respective retaining recesses, each of the mounting elements having a horizontal bias to a respective mounting platform and having depending snap acting elements receivable within the corresponding recess, at least some of the recesses having dimensions greater than that of the snap acting elements to provide the degree of freedom of movement.

8. A steering wheel according to claim 7 wherein each of the recesses is provided within the respective platform.

9. A steering wheel according to claim 7 wherein each of the recesses is provided at a position adjacent the respective platform.

10. A steering wheel according to claim 7 wherein each of the platforms is located beneath a peripheral lip provided on the air-bag unit, the portion of the mounting element that lies over top of the external part of the steering wheel being in the form of a flange, the gap being defined between the peripheral lip and the flange.

* * * * *